US007070018B2

(12) United States Patent
Kachouh

(10) Patent No.: US 7,070,018 B2
(45) Date of Patent: Jul. 4, 2006

(54) MOTOR VEHICLE DOOR AND DOOR LOCK UNIT AS WELL AS MOTOR VEHICLE LOCKING SYSTEM

(75) Inventor: Checrallah Kachouh, Dortmund (DE)

(73) Assignee: Brose Schliessysteme GmbH & Co. KG, Wuppertal (DE)

( * ) Notice: Subject to any disclaimer, the term of this patent is extended or adjusted under 35 U.S.C. 154(b) by 24 days.

(21) Appl. No.: 10/775,329

(22) Filed: Feb. 11, 2004

(65) Prior Publication Data

US 2004/0251710 A1 Dec. 16, 2004

(30) Foreign Application Priority Data

Feb. 14, 2003 (DE) ................................ 103 06 610

(51) Int. Cl.
*B60R 25/00* (2006.01)

(52) U.S. Cl. ...................................... 180/287; 307/10.2

(58) Field of Classification Search ................ 180/287, 180/286, 289; 307/10.1, 10.2, 10.3; 292/DIG. 3–5, 292/DIG. 23; 70/284, 285
See application file for complete search history.

(56) References Cited

U.S. PATENT DOCUMENTS

| | | | | |
|---|---|---|---|---|
| 4,307,789 | A * | 12/1981 | Bertot | 180/289 |
| 4,858,971 | A * | 8/1989 | Haag et al. | 292/201 |
| 5,931,682 | A * | 8/1999 | Takiguchi et al. | 439/34 |
| 6,135,778 | A * | 10/2000 | Ubelein | 439/34 |
| 6,441,512 | B1 * | 8/2002 | Jakel et al. | 307/10.2 |
| 6,599,444 | B1 * | 7/2003 | Burnell-Jones | 252/301.36 |
| 6,715,806 | B1 * | 4/2004 | Arlt et al. | 292/201 |
| 6,779,372 | B1 * | 8/2004 | Arlt et al. | 70/237 |
| 6,907,643 | B1 * | 6/2005 | Koops et al. | 16/438 |
| 2003/0070457 | A1 * | 4/2003 | Arlt | 70/256 |
| 2003/0111863 | A1 * | 6/2003 | Weyerstall et al. | 296/146.1 |
| 2003/0116977 | A1 * | 6/2003 | Erices | 292/201 |
| 2004/0004357 | A1 * | 1/2004 | Arlt et al. | 292/201 |
| 2004/0012226 | A1 * | 1/2004 | Morrison et al. | 296/146.5 |
| 2004/0160126 | A1 * | 8/2004 | Aoki et al. | 307/10.2 |
| 2004/0262945 | A1 * | 12/2004 | Suzuki et al. | 296/155 |
| 2005/0057047 | A1 * | 3/2005 | Kachouh et al. | 292/201 |

FOREIGN PATENT DOCUMENTS

| | | | |
|---|---|---|---|
| DE | 43 19 497 | A1 | 12/1994 |
| DE | 199 44 968 | A1 | 6/2001 |
| EP | 0 589 158 | A1 | 3/1994 |

* cited by examiner

*Primary Examiner*—J. Allen Shriver
(74) *Attorney, Agent, or Firm*—David S. Safran

(57) ABSTRACT

A motor vehicle door with a door lock unit located on the edge side with mechanical latching elements such as a latch and ratchet, with a preferably electrical opening drive for triggering the latching elements which is preferably integrated into the door lock unit, with a mechanical inside actuating element for emergency mechanical triggering of the latching elements, which is mechanically connected to the door lock unit, and with an the electrical inside actuating element for normal operational triggering of the opening drive for actuating the latching elements, which is connected by electrical-control technology to the opening drive. It is structurally optimized in that the mechanical inside actuating element is located on the inside of the motor vehicle door in the immediate vicinity of the door lock unit, its preferably being connected directly or only with a minimum intermediate mechanism to the inside actuating lever of the door lock unit.

22 Claims, 1 Drawing Sheet

MOTOR VEHICLE DOOR AND DOOR LOCK UNIT AS WELL AS MOTOR VEHICLE LOCKING SYSTEM

BACKGROUND OF THE INVENTION

1. Field of the Invention

Figure 1:
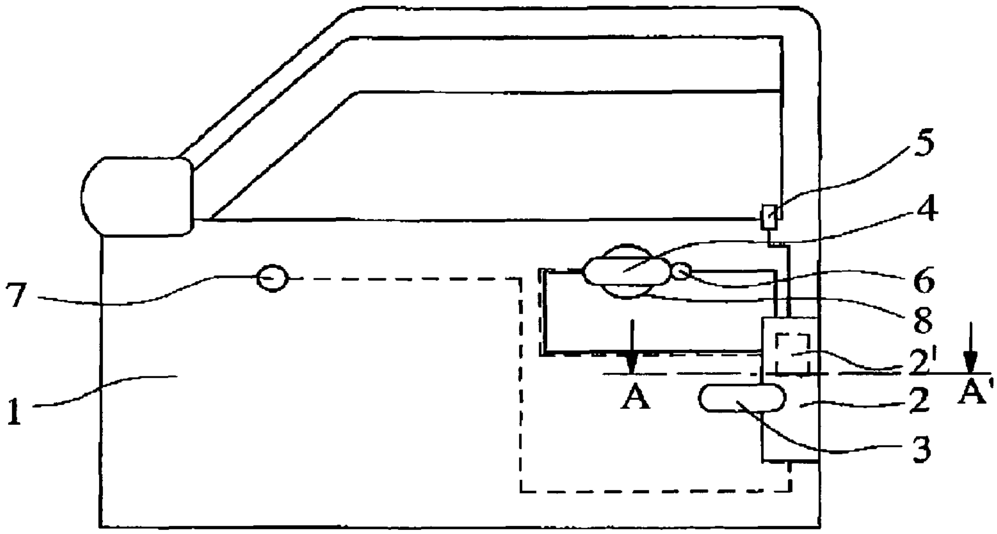

The invention relates, first of all, to a motor vehicle door with a door lock unit located on the edge side of a door body with mechanical latching elements, such as a latch and ratchet, with a preferably electrical opening drive for unlatching the latching elements, with a mechanical inside actuating element for emergency mechanical unlatching of the latching elements and which is mechanically connected to the door lock unit, and with an electrical inside actuating element for normal operational triggering of the opening drive for unlatcing the latching elements, which is connected by electrical-control technology to the opening drive of the door lock unit. The subject matter of the invention is also the door lock unit itself and a motor vehicle locking system using such a door lock unit. In this connection, it is noted that the term motor vehicle door also includes a rear door of a station wagon or a hatch of a so-called hatchback type vehicle.

2. Description of Related Art

The invention concerns a motor vehicle door, a door lock unit and a motor vehicle locking system based on the use of a door lock unit with mechanical redundancy. These systems have been known for a long time, but have become much more important only in recent years (DE 29 49 319 A1 corresponding to U.S. Pat. No. 4,307,789; DE 199 44 968 A1; EP 0 589 158 A1). Reference is made to the prior art explained here also for its complete disclosure content, and the disclosure content of these citations is made the disclosure content of this application by reference.

In a system with electric locks with mechanical redundancy, an operator who is located inside the motor vehicle must be able to open the electrical lock by actuating an electrical inside actuating element in normal operation. However, in an emergency when the electricity fails, the operator must be able to undertake emergency opening also by means of a mechanical inside actuating element.

The tendency is to form structural units for reasons of production engineering and installation engineering. Here, it must be considered in motor vehicle locking systems that, normally, the motor vehicle door, by means of a conventional partition, on the one hand, has a wet space which is directed toward the outside of the body, and on the other hand, a dry space which is directed towards the interior of the body. The door lock unit with the mechanical latching elements is generally located in the wet space.

In the prior art (DE 199 44 968 A1) which forms the closest prior art structural units are formed by combining both the electrical inside actuating element and also the mechanical inside actuating element which is used for mechanical redundancy, an electronic control unit and the electrical opening drive into a structural unit which is located completely on the dry space side of the motor vehicle door in a location used for a conventional inside handle for an operator. Via an extended lock mechanism, especially a Bowden cable which runs in the dry space and which is then routed through the partition into the wet space, this structural unit is connected to a door lock unit which is located on the edge of the motor vehicle door and which contains only the mechanical latching elements. In this prior art, as in all other sources for the prior art for motor vehicle locking systems with electric locks, the mechanical inside actuating element which is used for redundancy (inside door handle) is located a conventional site on the inside of the motor vehicle door in an easily reached grasping and viewing area of a person who is located in the interior.

In the above explained prior art, for further simplification of the construction, there is another unit by which the mechanical outside actuating element and the electrical outside actuating element are combined with the purely mechanical door lock unit into a unit which is mounted on the edge side of the motor vehicle door where it is accessible from the outside. Therefore, ultimately there is a unit in the dry space where the mechanical inside actuating element (inside door handle) properly has its space, and a unit in the wet space where the door lock unit must necessarily find its space, but is integrated here with the mechanical outside actuating element.

SUMMARY OF THE INVENTION

A primary object of the present invention is to further optimize the motor vehicle door, the door lock unit for a motor vehicle locking system, and a motor vehicle locking system as such.

This object is achieved by this invention in a motor vehicle door in which the mechanical inside actuating element is located on the inside of the motor vehicle door in the immediate vicinity of the door lock unit.

It has been recognized that the prior art which has been available for a long time and which goes back to the end of the sixties for motor vehicle locking systems with electric locks with respect to mechanical redundancy does not optimally achieve this object. For a long time, it has been such that the mechanical inside actuating element which is used for mechanical redundancy is made and arranged in exactly the same way as in classical, purely mechanical motor vehicle locks. However, this is not necessary, as the invention has recognized, because the mechanical inside actuating element for an electric lock need be actuated only in an emergency, therefore possibly only once or a few times during the entire life cycle of a motor vehicle. Proceeding from this analysis, the invention teaches that the mechanical inside actuating element is located where it can be optimally housed for construction reasons without regard to any ease of actuation for the operator located inside the motor vehicle. It is then directly on the door lock unit itself, an essential component of the motor vehicle with the mechanical latching elements.

The teaching of the invention is implemented, overall, on a motor vehicle door. However, commercial objects are also corresponding door lock units themselves which are configured according to the teaching of the invention.

Furthermore, the subject matter of the invention is a motor vehicle locking system which further embodies the basic concept of the invention. When using electric locks in a motor vehicle locking system, electrical inside actuating elements are necessary. In the above explained prior art (DE 29 49 319 A corresponding to U.S. Pat. No. 4,307,789), the electrical inside actuating elements of the motor vehicle locking system are activated or deactivated by means of a central locking/unlocking switch which is present in the interior of the motor vehicle. If the motor vehicle locking system is in the state in which it has been locked from the inside, two manipulations are necessary, specifically first the actuation of the locking/unlocking element, and then actuation of the electrical inside actuating element (inside electrical opener).

In accordance with the invention, the above explained two-step actuation is optimized by the electrical inside actuating element which has been deactivated from the state in which it was locked from the inside, causing unlocking for the first actuation proceeding from the inside and for a second actuation proceeding from the inside causing electrical triggering of the opening drive for actuating the latching elements of the door lock unit. Thus, electrically, the mechanical two-stroke function which is known as such from the prior art is optimally implemented.

The invention is explained in detail below with reference to the accompanying drawings.

BRIEF DESCRIPTION OF THE INVENTION

Figure 1A:
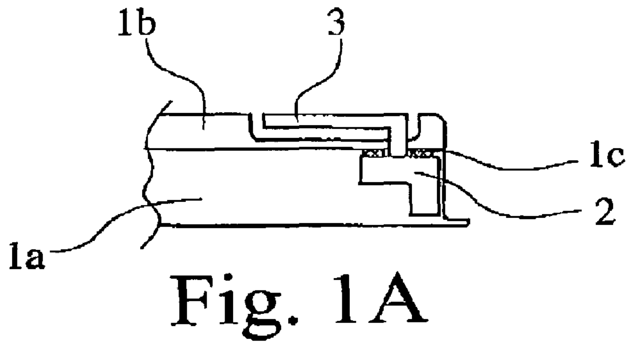

FIG. 1 schematically shows an embodiment of a motor vehicle door in accordance with the invention and FIG. 1A is a sectional view along line A—A in FIG. 1.

DETAILED DESCRIPTION OF THE INVENTION

The sole FIG. of the drawings shows a conventional driver-side side door which is coupled on the left to the A pillar of the body via hinges and on the right engages the B pillar by means of the door lock unit 2 which is located on the edge side with the motor vehicle door 1 closed. The door lock unit 2 contains the conventional mechanical latching elements, especially therefore a lock latch which is made as a rotary and a ratchet which keeps the lock latch engaged in the preliminary catch and the main catch (see, for example, the schematics in EP 0 589 158 A1).

The essential prerequisite for the teaching of this invention is the fact that the door lock unit 2 is provided with an opening drive 2' for triggering the latching elements and the drive itself is integrated here and preferably into the door lock unit 2. Preferably, it is an electrical opening drive 2', but basically also other types of drives are known and can be implemented (DE 199 44 968 A1).

Furthermore, the sole FIGURE shows a mechanical inside actuating element 3, conventionally called an inside door handle, for emergency mechanical unlatching of the latching elements in the door lock unit 2. It is of course mechanically connected to the door lock unit 2. Furthermore, there is a mechanical outside actuating element 4 which likewise can be actuated preferably only in the case of an emergency, generally called the outside door handle, a mechanical inside safety element 5 shown as an inside safety button, and a mechanical outside safety element 6 shown as a locking cylinder. The prior art shows other versions of the inside safety element 5 and the outside safety element 6, for example, a mechanical inside actuating element 3 with three positions into which the inside safety element 5 is thus integrated.

Furthermore, an electrical inside actuating element 7 is essential to the invention; with it, in normal operation, the opening drive 2' for the door lock unit 2 can be triggered in order to actuate the latching elements, therefore, to lift the ratchet so that the lock latch can release a striker which is located on the B pillar of the motor vehicle body to be able to open the motor vehicle door. The connection of the electrical inside actuating element 7 to the opening drive 2' of the door lock unit 2 is accomplished using electrical-control technology; this is shown by the broken line in the figure. This connection will normally take place via an electric line, and it can also be a BUS system. Wireless signal transmission is also theoretically possible.

It is feasible for the electrical inside actuating element 7, as shown, to be placed on the inside of the motor vehicle door 1. However, this is not essential, and basically, the electrical inside actuating element 7 need be reachable only by the operator inside the motor vehicle with an easy and intuitively good grasp.

Finally, there is also an electrical outside actuating element 8, for example, a proximity sensor on the outside of the motor vehicle door 1 which is connected in terms of electrical-control engineering to the opening drive of the door lock unit 2, here shown by a broken line.

It is important to the invention that the mechanical inside actuating element 3 on the inside of the motor vehicle door 1 is located in the immediate vicinity of the door lock unit 2. This can be accomplished in that the mechanical inside actuating element 3 is connected directly or only with a minimum intermediate mechanism to an inside actuating lever of the door lock unit 2. The minimum intermediate mechanism can be, for example, a small rod or a small lever which causes transfer of force from the mechanical inside actuating element 3 to the latching elements of the door locking unit 2. The preferred embodiment shown according to an especially preferred embodiment in this respect shows that the mechanical inside actuating element 3 is made and can be installed with the door lock unit 2 as a unit.

In the prior art, one special approach to routing the components through a passage opening in the partition in the motor vehicle door between the dry space and the wet space has already been accomplished (German Patent DE 196 53 733 C2 and corresponding U.S. Pat. No. 6,135,778, which is hereby incorporated by reference). This technique can also be used in conjunction with the teaching of this invention. To do this, it can be provided that the door lock unit 2 has a section which adjoins the partition between the wet space 1*a* and the dry space 1*b* of the motor vehicle door 1, forming a seal 1*c* around the passage opening, and that the mechanical inside actuating element 3 in this section passes through the passage opening to the inside of the motor vehicle door 1. This yields an optimum penetration for the connection of the mechanical inside actuating element 3 because an additional seal need not be used.

It has already been pointed out above that in the prior art the consequences of using electric locks in motor vehicle locking systems had not been thoroughly considered. In this connection it is recommended that the teaching of this invention be further embodied in that the mechanical inside actuating element 3 is not designed and/or dimensioned for extended loading. The mechanical inside actuating element 3, therefore the inside door handle, is kept as simple as possible, need not achieve a long service life and need not be made especially elegant. This inside door handle is present solely for purposes of convenience and need meet only these requirements.

Of course, the mechanical inside actuating element 3, if it intends to perform its emergency function, must be able to be easily recognized by the operator inside the motor vehicle. To do this, it can be provided that the mechanical inside actuating element 3 be painted in a conspicuous color, marked with a conspicuous color and/or be conspicuously labeled and/or that the mechanical inside actuating element 3 be made to be easily recognized by fluorescence effects and/or illumination.

The electrical inside actuating element 7 can be set up and arranged for the normal state differently than the mechanical inside actuating element 3, as has already been explained. For this purpose, it can be provided that the electrical inside actuating element 7 be located in the interior of the motor vehicle, especially on the inside of the motor vehicle door 1, at a location which is easily accessible and detectable for the user.

As has already been explained above, the teaching of the invention can also be recognized on the construction of a door lock unit 2 which is individualized functionally for the invention.

Finally, for a motor vehicle locking system, in general, it is advantageous that the electrical inside actuating element 7 which is deactivated, in the state in which it has been locked from the inside, causes unlocking for the first inside actuation and with a second inside actuation causes electrical triggering of the opening drive for actuating the latching elements of the door lock unit 2. Of course, for the motor vehicle locking system, the use of a locking/unlocking switch located in the interior which is known in the prior art can also be provided (above referenced published German Patent Application DE 29 49 319 A1 and corresponding to U.S. Pat. No. 4,307,789). The electronic/electrical double stroke concept implemented here is, however, convincing due to its intuitively optimum understandability.

What is claimed is:

1. Motor vehicle door, comprising:

a door body, a door lock unit having with mechanical latching elements located on an edge side of the door body, an opening drive for unlatching the latching elements, a mechanical inside actuating element for emergency mechanical unlatching of the latching elements, said mechanical inside actuating element being mechanically connected to the door lock unit, and an electrical inside actuating element for normal operational triggering of the opening drive for unlatching the latching elements, said electrical inside actuating element being connected by electrical-control technology to the opening drive, wherein the mechanical inside actuating element is located on an inner side of the door body in the immediate vicinity of the door lock unit.

2. Motor vehicle door as claimed in claim 1, wherein the mechanical inside actuating element is connected substantially directly to an inside actuating lever of the door lock unit.

3. Motor vehicle door as claimed in claim 2, wherein the mechanical inside actuating element is formed as part of the door lock unit.

4. Motor vehicle door as claimed in claim 1, wherein the door lock unit has a section adjoining a partition between a wet space of the door body and a dry space of the door body, and wherein the mechanical inside actuating element passes through a passage opening to the inside of the door in the area of the partition, a seal being formed around the opening.

5. Motor vehicle door as claimed in claim 1, wherein the mechanical inside actuating element if formed of plastic.

6. Motor vehicle door as claimed in claim 1, wherein the mechanical inside actuating element is at least one of painted in a conspicuous color, marked with a conspicuous color and conspicuously labeled.

7. Motor vehicle door as claimed in claim 1, wherein the mechanical inside actuating element is made easily recognizable by at least one of fluorescence effects and illumination.

8. Motor vehicle door as claimed in claim 1, wherein the electrical inside actuating element is located in the interior of the motor vehicle.

9. Motor vehicle door as claimed in claim in claim 8, wherein the electrical inside actuating element is located at a location which is easily accessible and detectable for the user.

10. Motor vehicle door as claimed in claim 8, wherein the mechanical inside actuating element is at least one of painted in a conspicuous color, marked with a conspicuous color and conspicuously labeled.

11. Motor vehicle door as claimed in claim 10, wherein the mechanical inside actuating element is made easily recognizable by at least one of fluorescence effects and illumination.

12. Motor vehicle door as claimed in claim 1, wherein the opening drive is an electrical opening drive for unlatching the latching elements.

13. Motor vehicle door as claimed in claim 1, wherein the electrical inside actuating element is located on an inner side of the motor vehicle door.

14. Door lock unit for a motor vehicle door, the door lock unit having mechanical latching elements and being provided with an opening drive for unlatching the latching elements, wherein the door lock unit has a mechanical inside actuating element which is located in the immediate vicinity to the door lock unit.

15. Door lock unit as claimed in claim 14, wherein the mechanical inside actuating element is connected substantially directly to an inside actuating lever of the door lock unit.

16. Door lock unit as claimed in claim 15, wherein the mechanical inside actuating element is formed as part of the door lock unit.

17. Door lock unit as claimed in claim 14, wherein the mechanical inside actuating element is formed of plastic.

18. Door lock unit as claimed in claim 14, wherein the mechanical inside actuating element is one of painted in a conspicuous color, marked with a conspicuous color and conspicuously labeled.

19. Door lock unit as claimed in claim 14, wherein the mechanical inside actuating element is made easily recognizable by at least one of fluorescence effects and illumination.

20. Door lock unit as claimed in claim 14, wherein the door lock unit has a section adjoining a partition between a wet space of the door body and a dry space of the door body, and wherein the mechanical inside actuating element passes through a passage opening to the inside of the door in the area of the partition, a seal being formed around the opening.

21. Motor vehicle locking system, comprising:

at least one door lock unit with mechanical latching elements, an opening drive for unlatching the latching elements, an electrical inside actuating element for normal operational triggering of the opening drive for unlatching the latching elements, the electrical inside actuating element being connected to the opening drive by electrical-control technology in a manner enabling the electrical inside actuating element to be deactivated in a locked stated and to be re-activated by unlocking, wherein the electrical inside actuating element which has been deactivated in the locked state causes unlocking upon a first actuation thereof and upon a second interior side actuation thereof causes electrical triggering of the opening drive for unlatching the latching elements of the door lock unit.

22. Motor vehicle locking system as claimed in claim 21, wherein the opening drive is integrated into the door lock unit.

* * * * *

UNITED STATES PATENT AND TRADEMARK OFFICE

CERTIFICATE OF CORRECTION

PATENT NO. : 7,070,018 B2
APPLICATION NO. : 10/775329
DATED : July 4, 2006
INVENTOR(S) : Checrallah Kachouh and Josip Stefanic It is certified that error appears in the above-identified patent and that said Letters Patent is hereby corrected as shown below:

On The Title Page, should read
Item (75) INVENTOR(S) : Checrallah Kachouh, Dortmund (DE); Josip Stefanic, Odenthal (DE)

Signed and Sealed this

Fifteenth Day of April, 2008

JON W. DUDAS
*Director of the United States Patent and Trademark Office*